United States Patent [19]

Puretic

[11] 4,449,315

[45] May 22, 1984

[54] PURSE RING CONTROL APPARATUS FOR FISHING VESSELS

[76] Inventor: Mario J. Puretic, P.O. Box 58070, Tierra Verde, Fla. 33715

[21] Appl. No.: 410,934

[22] Filed: Aug. 24, 1982

[51] Int. Cl.³ .............................................. A01K 73/00
[52] U.S. Cl. ......................................................... 43/8
[58] Field of Search ............................................ 43/8, 7

[56] References Cited

U.S. PATENT DOCUMENTS

| | | | |
|---|---|---|---|
| 2,733,530 | 2/1956 | Puretic | 43/8 |
| 2,733,531 | 2/1956 | Puretic | 43/8 |
| 2,875,547 | 3/1959 | Puretic | 43/8 |
| 3,091,880 | 6/1963 | Puretic | 43/8 |
| 3,124,890 | 3/1964 | Puretic | 43/8 |
| 3,266,777 | 8/1966 | Vittone | 43/8 |
| 3,626,625 | 12/1971 | Whaley | 43/8 |
| 4,125,955 | 11/1978 | Puretic | 43/8 |

*Primary Examiner*—Gene P. Crosby
*Attorney, Agent, or Firm*—Fulwider, Patton, Rieber, Lee & Utecht

[57] ABSTRACT

Apparatus is disclosed for handling the purse rings of a net when brought alongside a fishing vessel by the net's purse line. A power operated davit arrangement maneuvers the purse rings by the purse line adjacent the vessel sidewall. Purse ring support apparatus is mounted below the davit and moveable to engage and hold the purse rings while netted fish are removed from the net. The purse rings are thereafter easily disengaged from the purse ring support apparatus.

15 Claims, 21 Drawing Figures

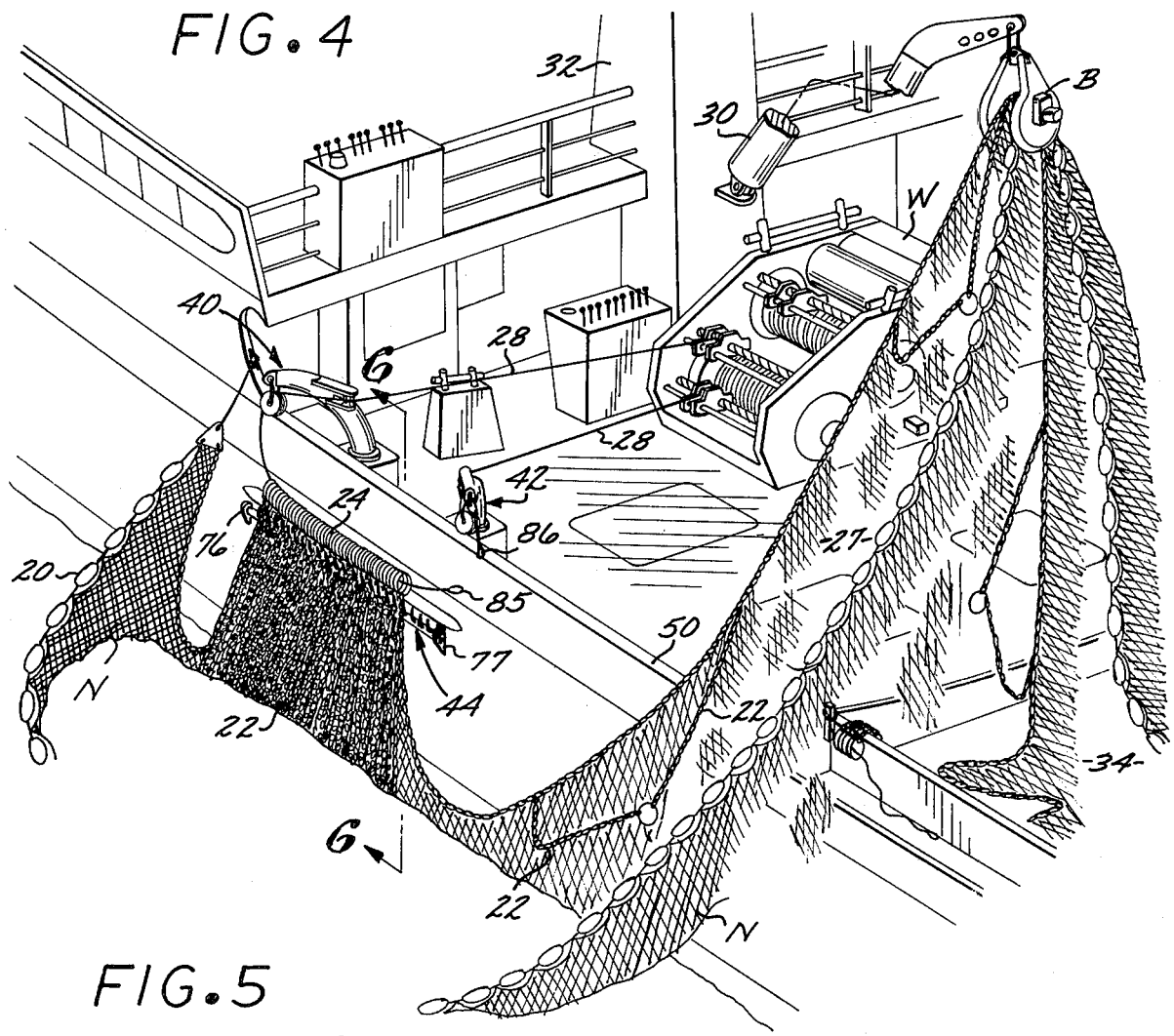

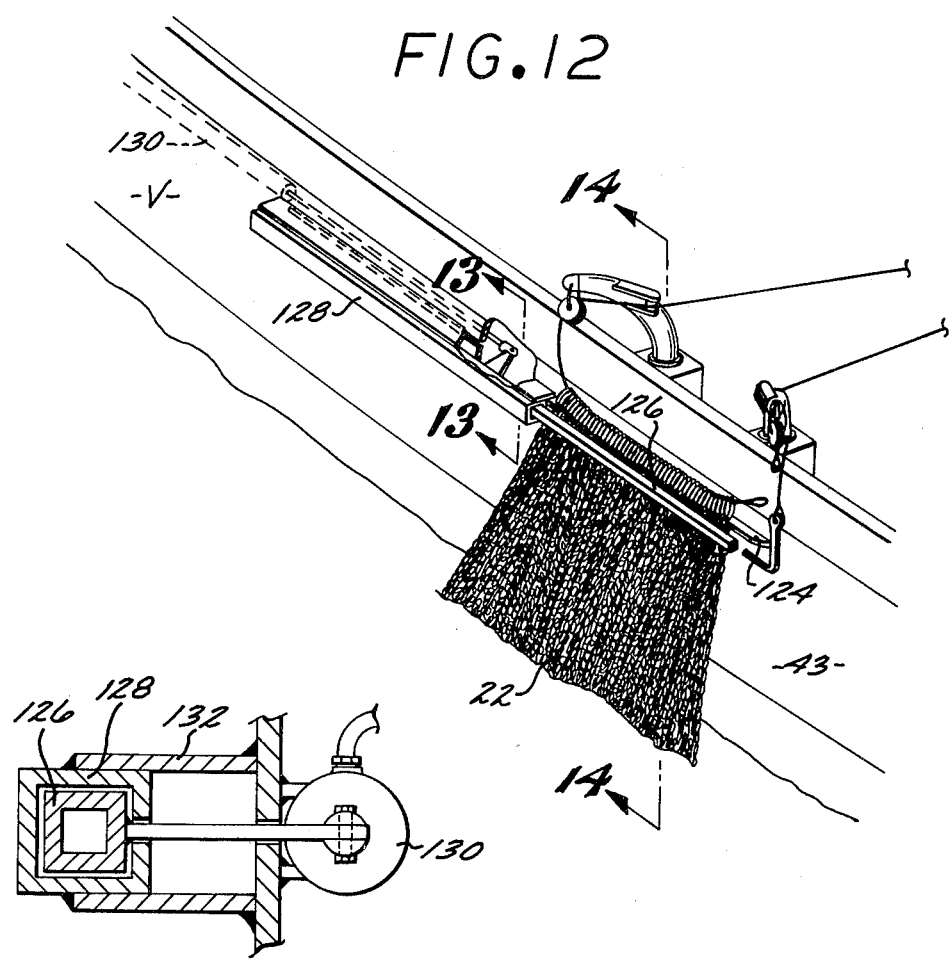
FIG. 12
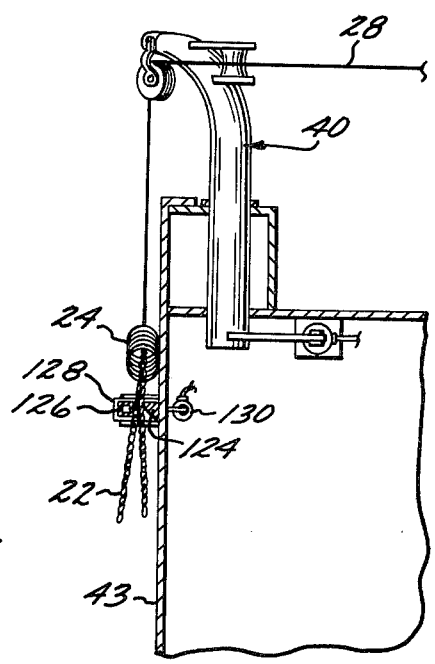
FIG. 13
FIG. 14

PURSE RING CONTROL APPARATUS FOR FISHING VESSELS

FIELD OF THE INVENTION

The present invention relates generally to the art of fishing and more particularly for a novel purse ring control apparatus utilized on a fishing vessel after the net has been brought alongside such vessel.

DESCRIPTION OF THE PRIOR ART

It is now conventional to draw a net alongside a fishing boat by means of a power-driven block of the type disclosed in my U.S. Letters Pat. Nos. 2,733,530 and 2,733,531 issued Feb. 7, 1956. The block is suspended from a boom on the boat. The use of such power-driven block has greatly expedited the hauling-in of the net alongside the boat, and it has been possible in many cases to substantially reduce the number of men required for a commercial fishing boat crew. Although the use of such power-driven blocks permits the netted fish to be brought alongside the fishing boat in an efficient, time-saving manner, there still remains the difficult problem of handling the purse rings of the net once the net is alongside the boat.

The "net" as referred to herein is commonly termed a seine net and includes a float or cork line attached to the webbing of the net at longitudinally spaced intervals along the upper edge of the webbing. The net webbing being supported by and depending from such cork line. The lower edge of the net webbing is secured to a weighted length of chain called a lead line. At longitudinally spaced intervals on such lead line are arranged a plurality of chain bridles. The lower ends of these chain bridles are each affixed to a purse ring. The purse rings removably receive a heavy pursing cable line. The pursing line is adapted to have its length reduced by engagement with a pursing winch so as to gather together the lower portion of the net and thereby trap fish within the confines of the net. As the pursing operation takes place, the purse rings are successively pulled onto the deck of the fishing boat and secured to such boat while the trapped fish are removed from the net. The purse rings are quite heavy and also slippery, thereby making it difficult to secure the purse rings. This difficulty is compounded with a heavy load of fish and/or during rough water operations.

In an effort to improve the purse ring handling apparatus, purse ring strippers of the type disclosed in U.S. Pat. No. 3,626,625, issued Dec. 14, 1971, have been utilized. Such a net stripper includes a rigid elongated channel member having one end attached to the fishing boat. A sheave is mounted on the free end of the channel member with the purse line extending over such sheave and through the channel member for movement by a purse winch. As the purse line is winched in, the purse rings in sequence move over the channel member falling by gravity thereonto. The rings may be stripped off the channel member in the reverse order when desired. This type of purse ring stripper embodies serious disadvantages, i.e., as the purse rings are pulled off the elongated member, such rings move in an uncontrolled, violent manner so as to be hazardous to the fishing boat crew located in the vicinity of such stripper. Additionally, the use of such purse ring stripper creates excessive abrasion of the purse line. Finally, the operation of such purse ring stripper is very time-consuming.

SUMMARY OF THE INVENTION

It is a major object of the present invention to provide apparatus for positively controlling fish net purse rings as the net is drawn alongside and onto a fishing vessel.

It is a more particular object of the present invention to provide apparatus of the aforedescribed nature employing ring-support means which are engaged with the purse rings as such rings are brought alongside a fishing vessel, with such means supporting the purse rings and net on the fishing boat while the netted fish are removed from the net and with such means thereafter permitting the purse rings to be easily successively disengaged from such prongs for stacking on the deck. Such apparatus additionally includes a novel arrangement for first collecting the purse rings and thereafter separating such rings for downward movement into engagement with the aforementioned ring support means.

Another object of the present invention is to provide ring control apparatus of the aforedescribed nature which is safe to use, thereby minimizing the possibility of injury to the fishing vessel crew.

Yet a further object of the present invention is to provide purse ring control apparatus of the aforedescribed nature which is simple in design and rugged in construction whereby it may afford a long and trouble free service life.

Yet an additional object of the present invention is to provide purse ring control apparatus of the aforedescribed nature which is power operated so as to reduce the amount of time and manual labor required to collect the purse rings.

Yet a further object of the present invention is to provide purse ring control apparatus of the aforedescribed nature which premits the net to be retrieved from either end or from both ends simultaneously when the bunt of the net is in the center.

BRIEF DESCRIPTION OF THE DRAWINGS

FIG. 4 is a view similar to FIG. 1, but showing a later step in the net retrieving operation.

FIG. 5 is a vertical sectional view taken along line 2—2 of FIG. 1 after the purse rings have been spread apart in the configuration shown in FIG. 4.

FIG. 6 is a vertical sectional view taken along line 6—6 of FIG. 4.

FIG. 12 is a perspective view of a fourth form of ring support means embodying the present invention.

FIG. 13 is a vertical sectional view taken in enlarged scale along line 13—13 of FIG. 12.

FIG. 14 is a vertical sectional view taken in enlarged scale along line 14—14 of FIG. 12.

DESCRIPTION OF PREFERRED EMBODIMENTS

Figure 1:
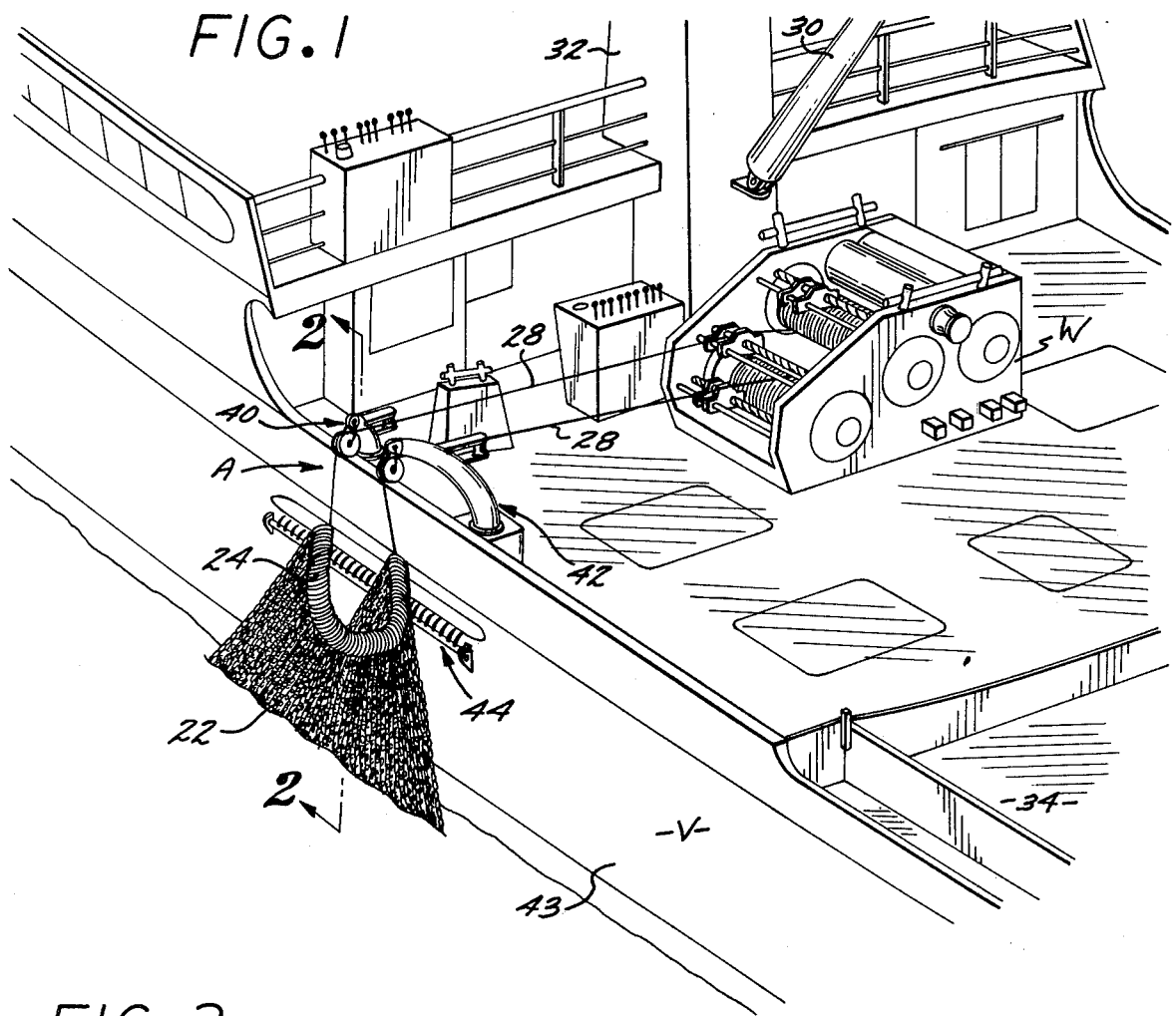
FIG. 1 is a perspective view of a first form of purse ring control apparatus embodying the present invention, with the net and its purse rings being shown drawn alongside a fishing vessel.
Figure 2:
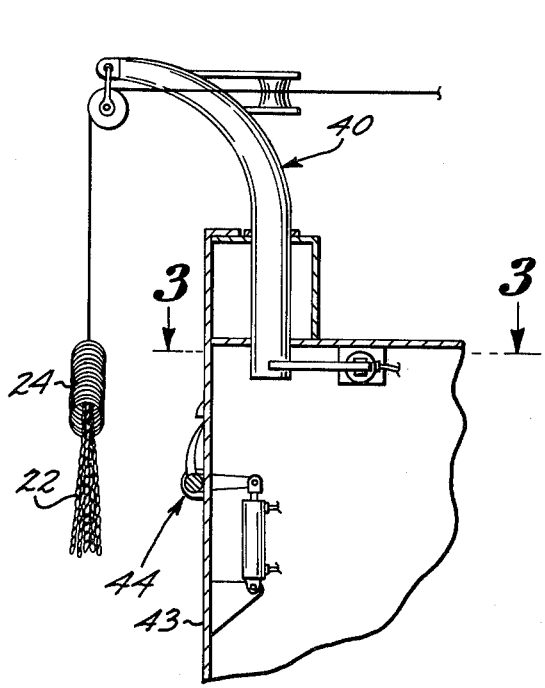
FIG. 2 is a fragmentary vertical sectional view taken in enlarged scale along line 2—2 of FIG. 1.
Figure 3:
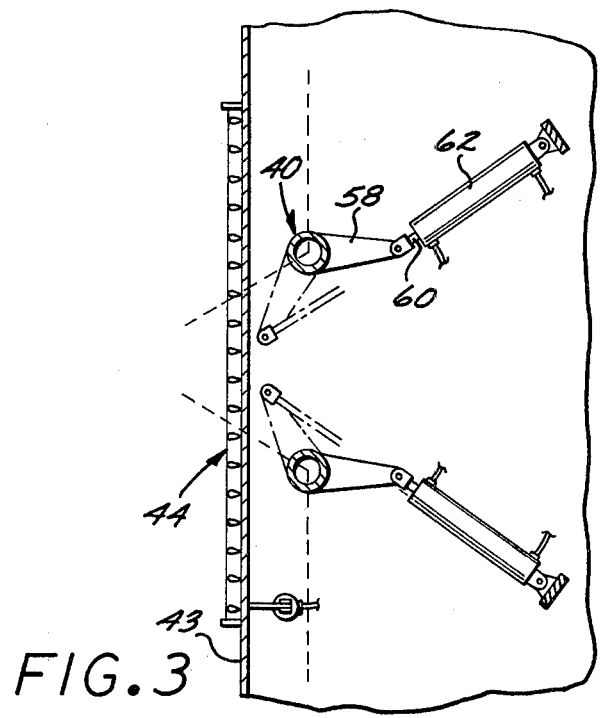
FIG. 3 is a horizontal sectional view taken along line 3—3 of FIG. 2.

Referring to the drawings, there is shown in FIGS. 1-6 a preferred form of purse ring control apparatus embodying the present invention. The apparatus is utilized in conjunction with a fishing vessel V which operates a conventional purse seine net N having a cork line 20 along its upper edge and provided along its lower edge with a chain lead line 21 connected to pairs of chain bridles 22 for purse rings 24. A purse line 28 extends through the purse rings 24 under the control of a conventional winch device W mounted upon the winch deck 27 of the fishing vessel V. The fishing vessel V is also provided with a conventional power-driven block B suspended from a boom 30, the lower end of the boom being secured to mast 32 aft of the winch W. The fishing vessel V is provided with a net deck 35 defined by enclosure 33 wherein the net is stacked when not in use. The net is removed from deck 34 during a fish-trapping operation and is returned thereto after the fish-trapping operation. The purse ring control apparatus shown in FIGS. 1-6 includes a pair of davits, generally designated 40 and 42, mounted adjacent a sidewall 43 of vessel V and a purse ring support member, generally designated 44 also mounted adjacent the same sidewall 43.

More particularly, the pair of davits 40 and 42 are of like construction, each including a curved arm 46 having an upright section vertically rotatably journaled within a support box 50 positioned upon deck 27 adjacent rail 50. A fairlead 52 for purse line 28 is pivotally carried by a support 54 that extends from the upper portion of each arm 46. The free end of each such arm is provided with a sheave 54 through which extends purse line 28. The lower end of each arm extends below deck 27 to be affixed to a horizontal crank arm 58. The opposite end of such crank arm 58 is pivotally connected to the free end of the plunger element 60 of a conventional two-way hydraulic cylinder and plunger unit 62. Each unit is pivotally affixed to a bracket 64 which rigidly depends from the underside of deck 27. Actuation of the units 62 will effect a pivotal movement of the davits between their positions of FIG. 1 and FIG. 4, i.e., a position where the free ends of such davits extend outwardly away from the sidewall 43 of vessel V shown in FIGS. 1 and 2, and a position wherein the free ends of such davits are swung away from one another to a position adjacent such sidewall shown in FIGS. 4, 5, and 6.

The purse ring support means 44 are mounted on sidewall 70 of vessel V below the davits 40 and 42. The ring support means 44 includes a plurality of curved prongs 72 of like construction arranged in a parallel fashion in a longitudinally spaced array along a horizontal bar 74, the prongs being rigidly affixed as by welding to such bar. The bar 74 extends fore and aft relative to the fishing vessel with its opposite ends being pivotally supported between a pair of bearings 76 and 77 rigidly affixed as by welding to the outside of hull sidewall 70. A crank arm 78 extends from the aft portion of bar 74 through an aperture formed through sidewall 70, such crank arm being rigidly affixed as by welding to the bar. The opposite end of crank arm 78 is pivotally affixed to the upper end of the plunger element 80 of a vertically extending plunger and cylinder unit 82. The lower end of such unit is pivotally affixed to a bracket 84 which is in turn rigidly affixed to the interior of hull sidewall 70. As indicated in FIGS. 5 and 6, actuation of unit 82 serves to pivot the prongs 72 from their initial upstanding retracted position proximate to sidewall 70 shown in FIGS. 1, 2, and 5 outwardly to their upwardly and outwardly extending position of FIGS. 4 and 6.

In the operation of the purse ring control apparatus shown in FIGS. 1-6 and referring first to FIG. 1, the net N has been drawn alongside fishing vessel V with trapped fish therein. The purse line 28 has been drawn inwardly so as to pull the purse rings 24 and their chains 22 out of the water. At this time the davits 40 and 42 are extending athwartswise of vessel V. In this position of the davits, the weight of the net and any trapped fish causes the assembly of purse rings to assume the generally U-shaped pattern shown in FIGS. 1 and 2. At this time the prongs 72 will be disposed in their upstanding position of FIGS. 1, 2, and 5. Next, the davits 40 and 42 are swung away from one another so as to assume their positions of FIGS. 4 and 5 wherein their free ends are disposed adjacent sidewall 70. During such davit movement the winch line 28 is maintained taut. Accordingly, the swinging movement of the davits will serve to concurrently align the purse rings 24 in a generally fore and aft, horizontally extending pattern above the prongs 77. The prong bar 74 will then be rotated so as to pivot the prongs to their upwardly and outwardly extending position of FIGS. 4 and 6. At this time the bridle chains 22 will extend vertically between the spaces defined by adjoining prongs. Next, the winch line 28 is relaxed so as to lower the purse rings and chains towards prongs 72, with such prongs then engaging the bridle chains so as to support such bridles, as well as the weight supported by such bridles. The purse rings 24 do not support any weight thereafter during the remainder of the net retrieving operation.

With particular reference to FIG. 4, the aft section 28(a) of purse line 28 may be separated from the main section thereof after the bridles are engaged with the prongs. This separation may be made possible by providing the end of purse line 28 with a loop 85 removably engageable with a hook 86 attached to the free end of aft purse line section 28(a). With aft purse line section 28(a) detached the power block B may be rotated so as to retrieve the net N, its cork and lead lines and the purse rings 26, as indicated in FIG. 4. It is particularly important to note that the arrangement of the prongs 72 permit the purse ring bridles 22 and attached purse rings 24 to be individually readily withdrawn from the purse ring support means 44 as the net is lifted upwardly by the power-driven block B. With continued reference to FIG. 4, after passing through the power block B, the net and its attached lines will descend by gravity into the confines of the net-retrieving deck 34. It will be apparent that the aforedescribed purse ring control apparatus and its method of operation permit the net retrieving operation to be conducted safely, rapidly, and with a minimum expenditure of manual labor.

Figure 7:
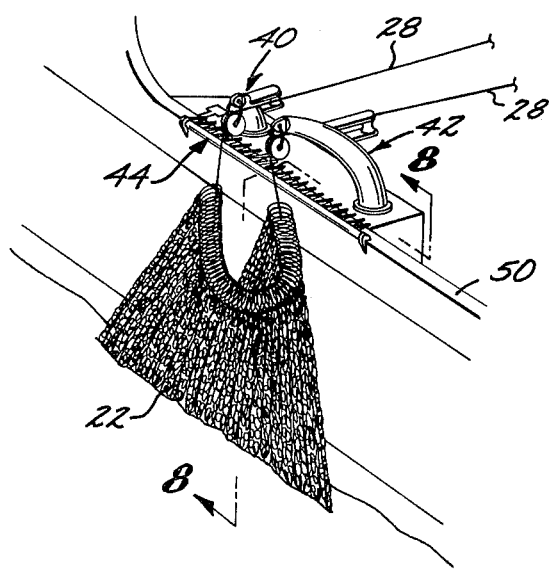
FIG. 7 is a fragmentary perspective view of a second form of ring support means embodying the present invention.
Figure 8:
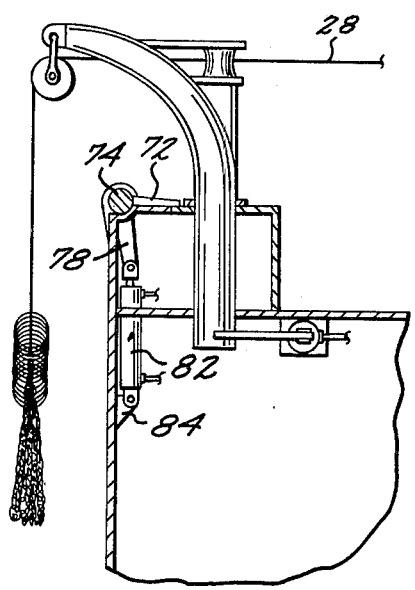
FIG. 8 is a vertical sectional view taken along line 8—8 of FIG. 7.
Figure 9:
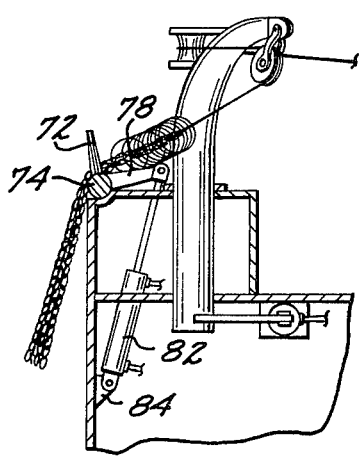
FIG. 9 is a view similar to view FIG. 8, but showing the purse rings moved into a separated configuration above the ring support means.

Referring now to FIGS. 7, 8, and 9, there is shown a second form of purse ring control apparatus embodying the present invention. Such apparatus is substantially similar to that shown in FIGS. 1–6, with the exception that the prong support bar 74 and its attached prongs 72 are disposed upon the upper edge of rail 50. With this arrangement, the setback of the davits 40 and 42 permit the purse rings 26 to be drawn over the edge of the rail 50 before they are lowered to removably engage bridles 22 with the upwardly and outwardly extended prongs.

Figure 10:
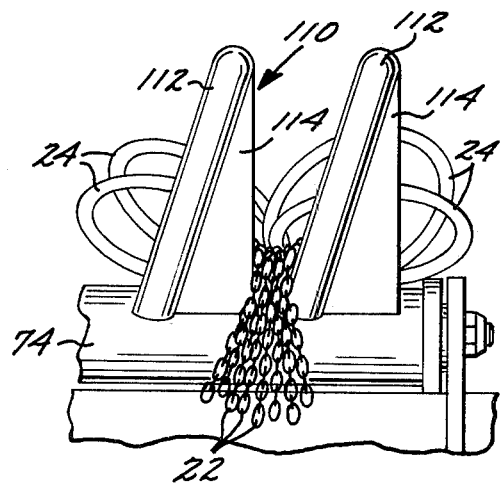
FIG. 10 is a broken side view in enlarged scale of a third form of ring support means embodying the present invention.
Figure 11:
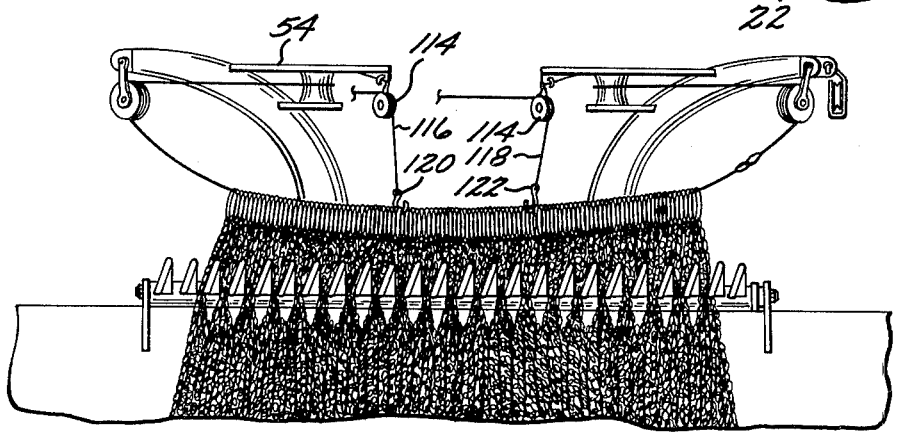
FIG. 11 is a side view showing how the ring support means of FIG. 10 is employed in a purse ring gathering operation.

FIGS. 10 and 11 show an alternative form of prong generally designated 110 which may be substituted for the aforedescribed prongs 72 on support bar 74. The prongs 110 are of like construction and are formed by a rearwardly slanted tube 112 having its lower end rigidly affixed to bar 74. The rear edge of each tube is rigidly affixed to a triangular-shaped plate 114. This prong arrangement assures easy disengagement of the purse ring chain bridles 22 from the spaces separating the prongs because of the rearward slant of tubes 112. Additionally the tube 112 can be made particularly abrasion-resistant. With continued reference to FIG. 11, the aft end of fairlead supports 54 of the davits 40 and 42 are each provided with a sheave 114 over which passes auxiliary lifting lines 116 and 118. The ends of these lifting lines are provided with hooks 120 and 122 which can engage the intermediate portion of the purse line 28 so as to provide auxiliary lifting force where particularly heavy net loading conditions are encountered. With the exception of the aforedescribed modified form of prongs 110 and these auxiliary lifting lines 116 and 118, the purse ring control apparatus of FIGS. 10 and 11 is similar in construction and operation to that shown in FIG. 7, 8, and 9.

Referring now to FIGS. 12, 13, and 14, there is shown yet another form of purse ring control apparatus embodying the present invention. In this form of the invention, the arrangement of the davits 40 and 42 is similar to that described hereinbefore, but the purse ring support means is of a different construction than that set forth hereinbefore. This form of purse ring support means includes a horizontal elongated abutment fin 124 that is rigidly affixed to the sidewall 43 of the fishing vessel generally centrally aligned with and below the davits. The fin 124 cooperates with a hollow choking bar 126 longitudinally slidably carried within a housing 128 under the control of a hydraulic cylinder and plunger unit 130 disposed inwardly of hull sidewall 70. The housing 128 is rigidly affixed to the exterior of such wall by a pair of brackets 132. When the choking bar 126 is extended rearwardly to its position of FIG. 12, its aft end is supported by means of a hook 134 carried by a line 136 which may be anchored adjacent the aft davit 42.

In the operation of this form of the apparatus, the davits 40 and 42 are utilized to raise the purse rings and their chain bridles in the manner described hereinbefore. With the choking bar 126 retracted within housing 128, the purse rings and bridles move freely upwardly over fin 124. With the purse rings disposed above the fin 124, the hydraulic choking bar 126 is extended to its position of FIG. 12 and the hook 134 secured thereto. The winch line 28 may then be operated so as to lower the purse rings 26 and their chain bridles 22 until such bridles are supported by the extended choking bar. The looped aft portion of the winch line 28 as well as the supporting hook 134 may then be removed. Operation of the power block will then automatically, successively withdraw the purse rings and their chain bridles from the space between fin 124 and choking bar 126.

Figure 15:
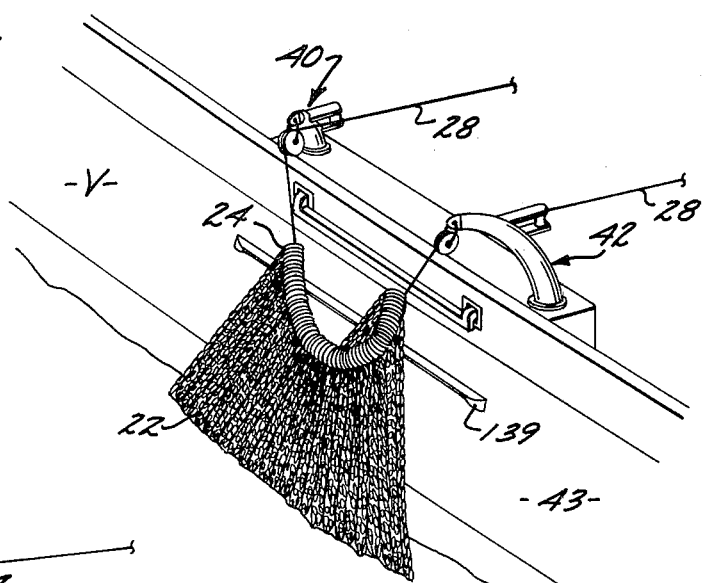
FIG. 15 is a perspective view of a fifth form of ring support means embodying the present invention, with such means being shown in its initial position as the purse rings are raised thereabove.
Figure 16:
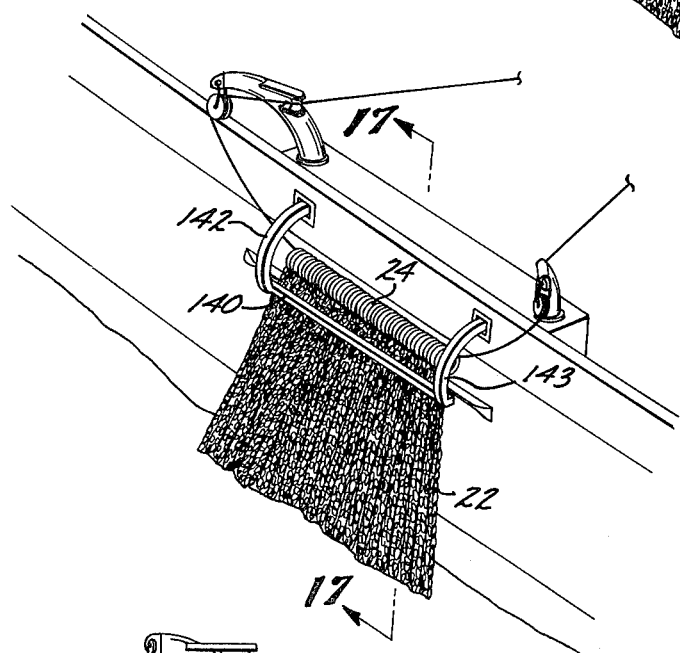
FIG. 16 is a view similar to FIG. 15 showing the ring support means thereof supporting the purse rings.
Figure 17:
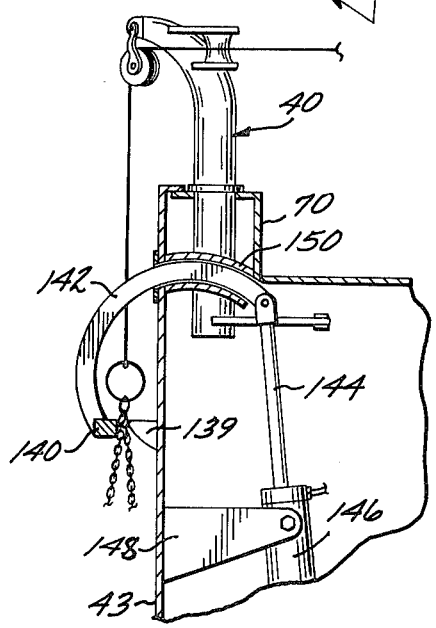
FIG. 17 is a side elevational view taken in enlarged scale along line 17—17 of FIG. 16.

Referring now to FIGS. 15, 16, and 17, there is shown yet another form of purse ring control apparatus embodying the present invention and utilizing the aforedescribed davits 40 and 42. This form of the invention utilizes an elongated fin 139 similar to the fin utilized in the apparatus of FIGS. 12–14. This apparatus also includes a choking bar 140 similar to the choking bar of the apparatus of FIGS. 12–14, with the exception of its mounting means. Thus, in the apparatus of FIGS. 15, 16, and 17 the choking bar 140 is carried at the free ends of a pair of like, curved actuating arms 142 and 143. The opposite end of each such arm is pivotally affixed to the upper end of the plunger unit 144 of a conventional hydraulic cylinder and plunger unit 146. The upper portion of such units are pivotally supported by a bifurcated bracket 148 having its outer end rigidly affixed as by welding to the interior of sidewall 70. The actuator arms 142 and 143 are each slidably supported for athwartship movement between a retracted and an extended position within a curved channel member 150, each rigidly secured to the hull of vessel V adjacent the underside of rail 70.

In the operation of this form of the apparatus, the davits 40 and 42 are utilized to raise the purse rings and their chain bridles above fin 139 in the manner described hereinbefore. At this time the choking bar 140 is disposed in its raised position shown in FIG. 15, the actuator arms at this time being retracted. With the purse rings disposed above the fin 139 the choking bar 140 is extended downwardly into a position just outwardly of the fin. The winch line 28 may then be operated so as to lower the purse rings and their chain bridles until the latter elements are supported by the extended choking bar. It will be apparent that the purse rings may be freely withdrawn rearwardly from the space between fin 139 and choking bar 140 as the net is raised by the power block.

Figure 18:
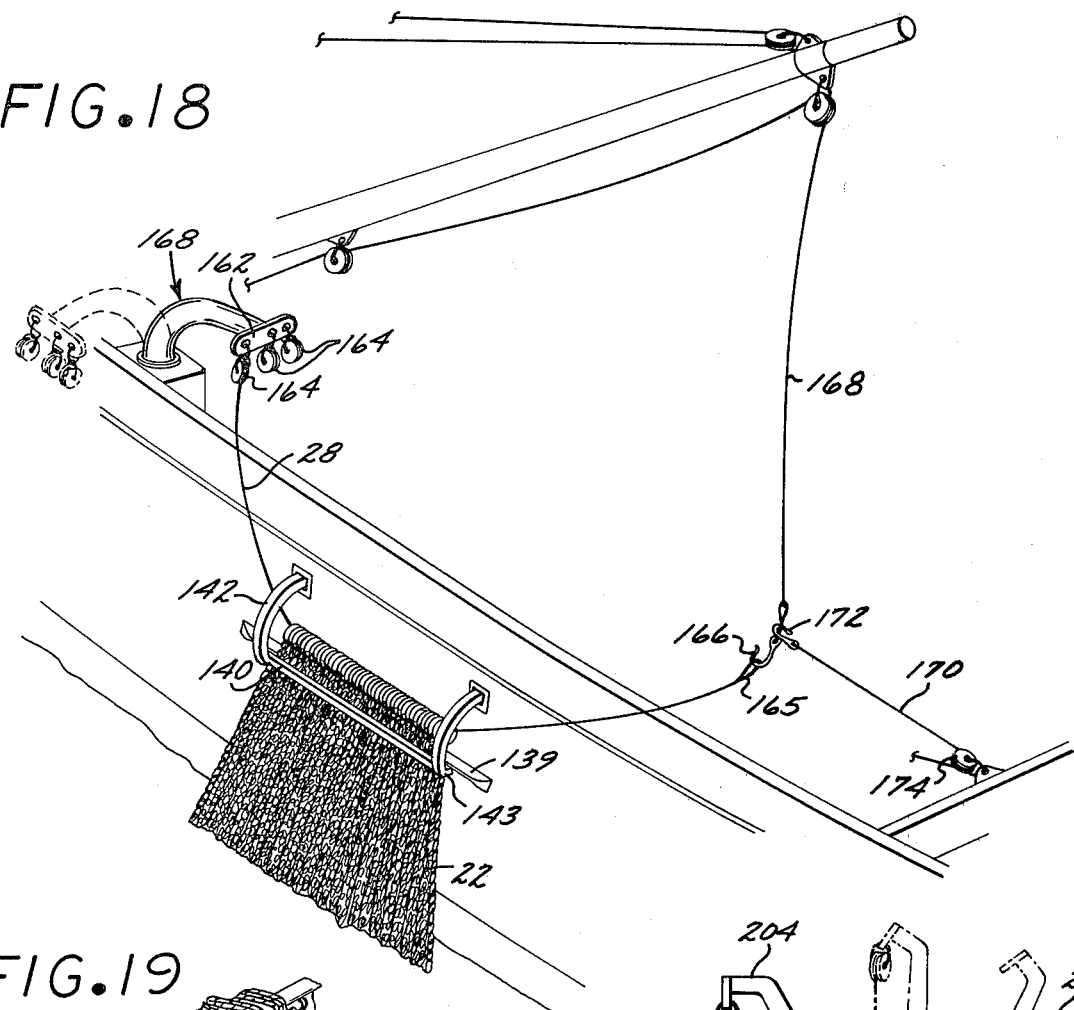
FIG. 18 is a perspective view of another embodiment of the purse ring control apparatus of the present invention.

Referring now to FIG. 18, there is shown yet another form of purse ring control apparatus embodying the present invention. In this form of apparatus the purse ring support means may be of the same type disclosed in FIGS. 15–17. The apparatus of FIG. 18 employs solely a single davit 160, the free end of which is rigidly affixed to a support 162 for a plurality of like idler sheaves 164 which receive selectively the purse line 28. The opposite end of purse line 28 is shown provided with loop 165 engagable with a hook 166 connected to the lower end of a boom lift line 168. A messenger line 170 has one end provided with a second hook 172, with such messenger line extending aft through a sheave 174 fixed to the hull of the fishing vessel and then extending to a power-driven winch (not shown). It should be understood that the davit 160 may be rotated from an initial athwartswise position shown in dotted outline in FIG. 18 to a rearwardly extending position shown in solid outline in this figure.

In the operation of the apparatus shown in FIG. 18, the winch line 28 is employed to collect the purse rings 26 and their chain bridles 22 in the manner described hereinbefore. At that time the davit 160 is disposed in its athwartwise position. During such ring-lifting operation, the aft end of the winch line may be anchored by the messenger line 170, or alternatively may be taken in by such messenger line. After the rings 24 have been disposed in their U-shaped pattern above fin 139, davit 160 is swung rearwardly so as to dispose the ring bridles in close proximity to the fin 139. The choker bar 140 is then extended so as to anchor the ring bridle chains. The loop 165 may then be disengaged from the first hook 166 and the purse rings and their attached chain bridles are free to be pulled out from the space between the fin and the choker bar as the power-driven block B raises the net.

Figure 19:
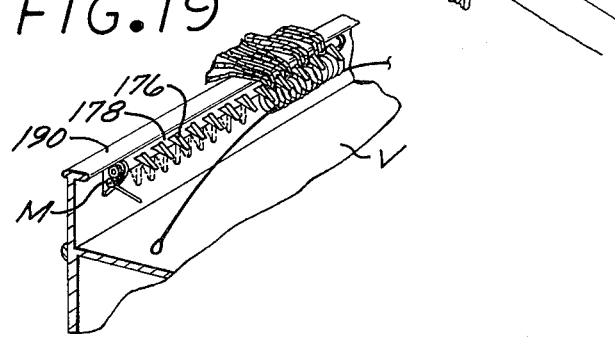
FIG. 19 is a fragmentary perspective view of a ratchet type ring support means of the present invention.

FIG. 19 discloses a purse ring support means utilizing a plurality of prongs 176 secured to a horizontal support bar 178 pivotally carried on the upper interior of rail 190 of vessel V. In this arrangement, the prong support bar 74 is manually rotated by means of a conventional ratchet mechanism M rather than being power operated. This arrangement is particularly useful in fishing for salmon and may be installed on both the port and starboard rails of a fishing vessel thereby permitting the crew to set nets on either side of the vessel.

Figure 20:
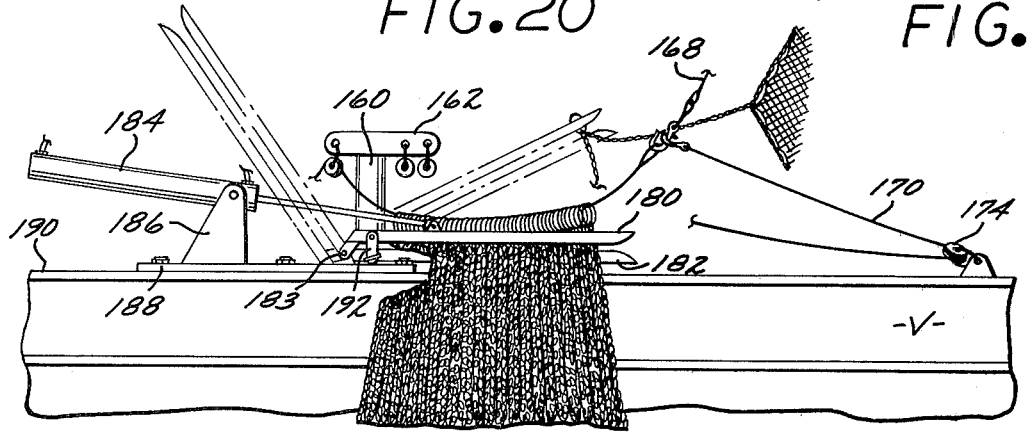
FIG. 20 is a side view of yet another embodiment of the present invention.

Referring now to FIG. 20, there is shown yet another embodiment of the present invention. This embodiment utilizes a single davit 160 of the type shown in FIG. 18, together with a boom lift line 168 and a messenger line 170. The purse ring support means, however, includes a pair of vertically aligned clamp bars 180 and 182, which are pivotally connected at their forward end by hinge pin 183 in such a manner that the clamp bars may be jointly raised from a rearwardly horizontally extending, retracted position to a forwardly and upwardly inclined position shown in dotted outline in FIG. 20 by means of a conventional hydraulic cylinder and plunger unit 184. Unit 184 is pivotally supported by a pair of upstanding brackets 186, having their lower ends supported by a plate 188 which is secured to the rail 190 of fishing vessel V. A locking link 192 interconnects the forward portion of clamp bars 180 and 182 in such a manner that the upper clamp bar 182 may be selectively raised by unit 184 while lower clamp bar 182 remains in a horizontally and rearwardly extending position shown in solid outline in FIG. 20. In the operation of this embodiment of the invention, the winch line 28 is employed to collect the purse rings 24 and their chain bridles 22 in the manner described hereinbefore. Thereafter, davit 160 and lines 168 and 170 are utilized to dispose the ring bridles in close proximity to the side of the vessel V. During this step of the operation, the upper clamp bar 180 is disposed in a raised position. With the purse rings elevated above the lower clamp bar 182, the unit 184 is actuated so as to pivot the upper clamp bar 180 into its lower-most position shown in FIG. 20, generally parallel to lower clamp bar 182. Thereafter, the purse rings and their bridles may be lowered and in such lowered position they will be supported by the upper and lower clamp bars. With the locking link 192 securing the clamp bars in their parallel position, the unit 184 will again be actuated so as to concurrently pivot the clamp bars and hence the purse rings and their bridles to an upwardly and rearwardly extending position. The loop 165 may then be disengaged from the first hook 166, and the purse rings and their attached chain bridles are free to be pulled out from the space between the upper and lower clamp bars. Although the aforedescribed lifting of the clamp bars assists in the purse ring removal operation, it is not always essential that the clamp bars be raised from their horizontal position in order to effect purse ring removal.

Figure 21:
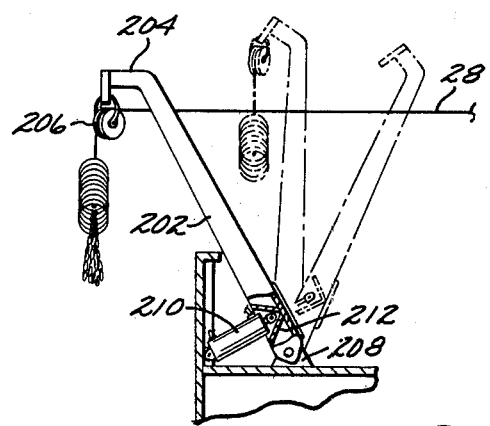
FIG. 21 is a side elevational view of a preferred type of davit arrangement of the present invention.

Referring now to FIG. 21, there is shown a preferred, simple form of davit generally designated 200 embodying the present invention. Davit 200 includes a straight arm portion 202 which merges into an elbow 204 at its upper end. Elbow 204 supports purse line davit 206. The lower end of arm 202 is pivotally supported by bracket 208. Athwartship movement of the davit is provided by means of a hydraulic cylinder and plunger unit 210 having its lower end pivotally connected to one side of the fishing vessel and its upper end in sliding abutment with a socket 212 formed on the lower portion of davit arm 202. The form of davit arrangement shown in FIG. 21 may be utilized with any of the aforedescribed purse ring support means. With this form of davit arrangement, the purse line winch W can assist the action of the hydraulic cylinder and plunger unit 210 in moving the davit and the weight supported thereby inboard.

Various modifications and changes may be made with respect to the foregoing detailed description without departing from the spirit of the present invention.

I claim:

1. Apparatus for handling the purse rings of a net as such net is brought alongside a fishing vessel by the net's purse line, said purse rings being carried by said purse line, said apparatus comprising:
    davit means mounted adjacent a sidewall of said vessel and having a free end supporting said purse line;
    power-operated means to move the free end of said davit means between a first position wherein said free end extends outwardly of said vessel sidewall and a second position wherein said free end is disposed adjacent said vessel sidewall; and
    purse ring support means mounted adjacent said vessel's sidewall below said davit means and movable between a retracted position when said davit means is in said second position and an extended position when said davit means is in said first position, whereby said support means temporarily supportingly engages said purse rings in said extended position for sequential removal of said purse rings from said support means.

2. Apparatus as set forth in claim 1 wherein said purse ring support means include a plurality of prongs arranged in a parallel fashion in a longitudinal spaced array along a horizontal bar that is rotated to move said prongs between their retracted and extended positions.

3. Apparatus as set forth in claim 1 wherein said purse ring support means include a horizontal abutment fin affixed to said sidewall and a choking bar longitudinally slidably supported by a housing secured to said sidewall for power-operated movement between a retracted position and an extended position with said purse rings being supported between said choking bar and said abutment fin when said choking bar is in its extended position.

4. Apparatus as set forth in claim 1 wherein said purse ring support means include a horizontal abutment fin affixed to said sidewall and a choking bar carried at the free ends of a pair of curved actuating arms for athwartship power-operated movement between a retracted and an extended position, with said purse rings being supported between said choking bar and said abutment fin when said choking bar is in its extended position.

5. Apparatus as set forth in claim 1 wherein said purse ring support means include a pair of clamp bars pivotally connected at one end for initial movement of the upper clamp bar to a raised position when said davit means are in said first position to receive said purse rings, and with said upper clamp bar being lowered to supportingly engage said purse rings when said davit means are moved to said second position.

6. Appartus as set forth in claim 1 wherein said purse ring support means are power-operated to move between said retracted and extended positions.

7. Apparatus as set forth in claim 1 wherein said davit means include a curved arm having an upright section vertically rotatably supported on said vessel to move said curved arm between said first and second positions, the free end of said arm supporting the purse line.

8. Apparatus as set forth in claim 1 wherein said davit means include an arm having its lower end pivotally supported on said vessel for athwartship movement by power-operated means, the upper portion of said arm supporting the purse line.

9. Apparatus as set forth in claim 2 wherein said bar is power-operated to rotate between said retracted and extended positions.

10. Apparatus as set forth in claim 9 wherein said prongs are slanted to facilitate disengagement of the purse rings from said prongs.

11. Apparatus as set forth in claim 9 wherein said prongs are slanted to facilitate disengagement of the purse rings from said prongs.

12. Apparatus as set forth in claim 8 wherein said purse ring support means include a plurality of prongs arranged in a parallel fashion in a longitudinal spaced array along a horizontal bar that is rotated to move said prongs between their retracted and extended positions.

13. Apparatus as set forth in claim 8 wherein said purse ring support means include a horizontal abutment fin affixed to said sidewall and a choking bar longitudinally slidably supported by a housing secured to said sidewall for power-operated movement of said choking bar between a retracted position and an extended position, with said purse rings being supported between said choking bar and said abutment fin when said choking bar is in its extended position.

14. Apparatus as set forth in claim 8 wherein said purse ring support means include a horizontal abutment fin affixed to said sidewall and a choking bar carried at the free ends of a pair of curved actuating arms for athwartship power-operated movement between a retracted and an extended position.

15. Apparatus for handling the purse rings of a net as such net is brought alongside a fishing vessel by the net's purse line, said purse rings being carried by said purse line, said apparatus comprising:
- a davit mounted adjacent a sidewall of said vessel and having a free end supporting said purse line;
- power-operated means to move the free end of said davit between a first position wherein said free end extends outwardly of said vessel sidewall and a second position wherein said free end is disposed adjacent said vessel sidewall;
- purse ring support means mounted adjacent said vessel's sidewall below and to one side of said davit and movable between a retracted position when said davit is in said second position and an extended position when said davit is in said first position, whereby said support means temporarily supportingly engages said purse rings in said extended position for sequential removal of said purse rings from said support means; and
- power-driven line means engagable with said purse line on the side of said purse ring support means remote from said davit to assist said davit in raising said purse rings above said purse ring support means.

* * * * *